United States Patent
Nakanishi et al.

(10) Patent No.: US 7,044,654 B2
(45) Date of Patent: May 16, 2006

(54) OPTICAL TRANSMISSION MODULE AND OPTICAL TRANSMITTER

(75) Inventors: Hiromi Nakanishi, Osaka (JP); Yoshiki Kuhara, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/705,073

(22) Filed: Nov. 10, 2003

(65) Prior Publication Data

US 2004/0105681 A1    Jun. 3, 2004

(30) Foreign Application Priority Data

Nov. 11, 2002    (JP)    ............................ P2002-327377

(51) Int. Cl.
*G02B 6/36*    (2006.01)

(52) U.S. Cl. .......................................... 385/88; 385/53

(58) Field of Classification Search .................. 385/33, 385/49, 88, 92, 93
See application file for complete search history.

(56) References Cited

U.S. PATENT DOCUMENTS 5,291,571 A * 3/1994 Kunikane et al. ............. 385/93
5,787,215 A * 7/1998 Kuhara et al. ................ 385/88

FOREIGN PATENT DOCUMENTS

| JP | 59-096789 | 6/1984 |
|----|-----------|--------|
| JP | 61-095590 | 5/1986 |
| JP | 61-156784 | 7/1986 |
| JP | 63-200590 | 8/1988 |
| JP | 09-055705 | 2/1997 |
| JP | 09-269440 | 10/1997 |
| JP | 10-173207 | 6/1998 |
| JP | 11-274650 | 10/1999 |
| JP | 2001-119095 | 4/2001 |

\* cited by examiner

*Primary Examiner*—Jennifer Doan
(74) *Attorney, Agent, or Firm*—Fish & Richardson P.C.

(57) ABSTRACT

An optical transmission module is constructed in a configuration wherein a semiconductor laser is mounted on a stem-side emitter loading portion of a pole provided on a stem and wherein light emitted forward from the semiconductor laser is outputted through a condenser lens and others. A monitor photodiode is mounted on a receiver loading portion of the pole on the forward side of the semiconductor laser and the photodiode detects part of the light emitted forward from the semiconductor laser, to monitor the operating condition of the semiconductor laser. This configuration achieves decrease in the length of a lead pin and thus restrains deterioration of the waveform of the drive current to the semiconductor laser.

10 Claims, 11 Drawing Sheets

OPTICAL TRANSMISSION MODULE AND OPTICAL TRANSMITTER

BACKGROUND OF THE INVENTION

1. Field of the Invention

The present invention relates to an optical transmission module configured to output an optical signal of light emitted from a light emitting device such as a semiconductor laser or the like, and an optical transmitter using it.

2. Related Background Art

In optical transmission systems using light as information transmission media, an optical transmission module provided with a semiconductor light emitting device such as a semiconductor laser is used as a transmitting means for transmitting an optical signal to be transmitted through an optical transmission line such as an optical fiber transmission line.

FIG. 11 is a front sectional view showing a configuration of a conventional optical transmission module. This optical transmission module 9 is constructed in the configuration wherein semiconductor laser 92 is mounted on pole 91 provided nearly perpendicularly to stem 90. Ahead of the semiconductor laser 92 in the opposite direction to the stem 90, condenser lens 93 and optical fiber 94 are located in order to output the light emitted from the semiconductor laser 92, as an optical signal to the outside.

A surface reception type monitor photodiode 96 is placed through submount 95 on the stem 90. This monitor photodiode 96 is a device that detects light emitted backward from the semiconductor laser 92 to monitor the operating condition of semiconductor laser 92 and that is located on the axis of emission of the backward light from the semiconductor laser 92, or at a position near it (e.g., reference is made to Document 1 "Japanese Patent Applications Laid-Open No. 59-96789", Document 2 "Japanese Patent Applications Laid-Open No. 61-156784", and Document 3 "Japanese Patent Applications Laid-Open No. 63-200590").

In the optical transmission module 9 using the semiconductor laser 92, the intensity of emitted light generally varies with change in ambient temperature, because of temperature dependence of emission output of the semiconductor laser 92. As a solution thereto, the photodiode 96 is used to monitor the operating condition of the semiconductor laser 92, and the drive current supplied to the semiconductor laser 92 is subjected to such feedback control as to keep constant the value of current monitored by the photodiode 96. This driving method of semiconductor laser is called APC (Automatic Power Control) driving and is adopted in the optical transmission modules using the light emitting devices such as semiconductor lasers or the like.

SUMMARY OF THE INVENTION

In recent years, transmission rates of optical signals are increasing with development of the optical communication systems. As the transmission rates increase to 1 Gbps and 2.5 Gbps and further to 5 Gbps and 10 Gbps, the optical transmission modules of the above configuration come to face the problem of deterioration of the waveform of the drive current supplied to the semiconductor laser and, in turn, deterioration of the waveform of the optical signal outputted corresponding thereto.

Specifically, in the optical transmission modules, the drive current to the semiconductor laser is supplied through a lead pin and a wire from a driving device. In this configuration, the drive current of a predetermined waveform such as a rectangular wave or the like can suffer broadening of the waveform due to the impedance (L and C components) of the lead pin and wire. This results in failure in flow of the accurate drive current to the semiconductor laser and, in turn, failure in outputting the optical signal of the accurate waveform. When the waveform of the optical signal is broadened in this way, it becomes difficult to transmit the optical signal over several kilometers at the transmission rates of not less than 1 Gbps.

On the other hand, the optical transmission modules using the semiconductor laser need to use the monitor photodiode for monitoring the operating condition of the semiconductor laser, as described above. Such a monitor photodiode is located on the stem side behind the semiconductor laser, as shown in FIG. 11. In this case, the length of the lead pin for supplying the drive current to the semiconductor laser becomes longer by the length of the space for mounting of the monitor photodiode, and it can be a factor of deteriorating the waveform of the drive current.

The present invention has been accomplished in order to solve the above problem and an object of the invention is to provide an optical transmission module capable of restraining the deterioration of the waveform of the drive current supplied to the light emitting device, and an optical transmitter using it.

An optical transmission module according to the present invention comprises (1) a stem as a base; (2) a mount member provided substantially perpendicularly to the stem; (3) a light emitting device mounted at a predetermined position on the mount member and configured to emit light along an axis of emission and forward in an opposite direction to the stem; (4) light outputting means disposed on the forward side of the light emitting device and configured to output the light emitted from the light emitting device, as an optical signal; and (5) a monitor light receiving device mounted at a position on the light outputting means side with respect to the light emitting device on the mount member and configured to detect part of the light emitted from the light emitting device.

In the foregoing optical transmission module, the monitor light receiving device for the light emitting device such as a semiconductor laser or the like is not located on the backward side of the light emitting device, but on the forward side thereof. Then the monitor light receiving device detects part of the light emitted forward from the light emitting device, thereby monitoring the operating condition of the light emitting device. This configuration obviates the need for locating the monitor light receiving device between the light emitting device and the stem and thus achieves decrease in the length of the lead pin. This restrains the deterioration of the waveform of the drive current supplied to the light emitting device.

In a configuration, the light outputting means has an optical waveguide (e.g., an optical fiber) for guiding the light emitted from the light emitting device, and a lens disposed between the light emitting device and the optical waveguide and making the light from the light emitting device enter the optical waveguide. This configuration enables the light from the light emitting device to be efficiently outputted.

As a configuration for mounting the light emitting device and the monitor light receiving device on the mount member, it is preferable to employ a configuration wherein the mount member has an emitter loading portion loaded with the light emitting device, and a receiver loading portion loaded with the monitor light receiving device and formed in a stepped shape relative to the emitter loading portion. As another configuration, it is preferable to use a configuration wherein at least one of an emitter loading member (a submount for loading of the light emitting device) loaded with the light emitting device and a receiver loading member (a submount for loading of the light receiving device) loaded with the monitor light receiving device is placed on the mount member.

These configurations suitably substantialize both the configuration of outputting the light emitted forward from the light emitting device, through the light outputting means to the outside, and the configuration of detecting part of the light emitted forward from the light emitting device, by the monitor light receiving device and thereby monitoring the operating condition of the light emitting device.

A configuration for outputting the light emitted from the light emitting device, as an optical signal can be a configuration wherein the light outputting means has a pigtail fiber for outputting the light emitted from the light emitting device, to the outside. In this case, the optical transmission module is constructed in the pigtail type configuration.

Another potential configuration is such that the module has a receptacle member arranged to receive an optical fiber or a fiber-integrated ferrule with an optical fiber therethrough for outputting the light emitted from the light emitting device, to the outside and that the light outputting means has an optical waveguide for guiding the light emitted from the light emitting device, into the optical fiber received by the receptacle member. In this case, the optical transmission module is constructed in the receptacle type configuration.

An optical transmitter according to the present invention comprises the foregoing optical transmission module; and a driving device for supplying a drive current to the light emitting device of the optical transmission module. This achieves the optical transmitter capable of well restraining the deterioration of the waveform of the drive current supplied from the driving device to the light emitting device and, in turn, restraining the deterioration of the waveform of the optical signal emitted from the light emitting device.

The present invention can be further fully understood in view of the detailed description and the accompanying drawings which will follow. It is noted that these are presented simply for the illustrative purpose but not for limitation of the present invention.

DETAILED DESCRIPTION OF THE PREFERRED EMBODIMENTS

Figure 1:
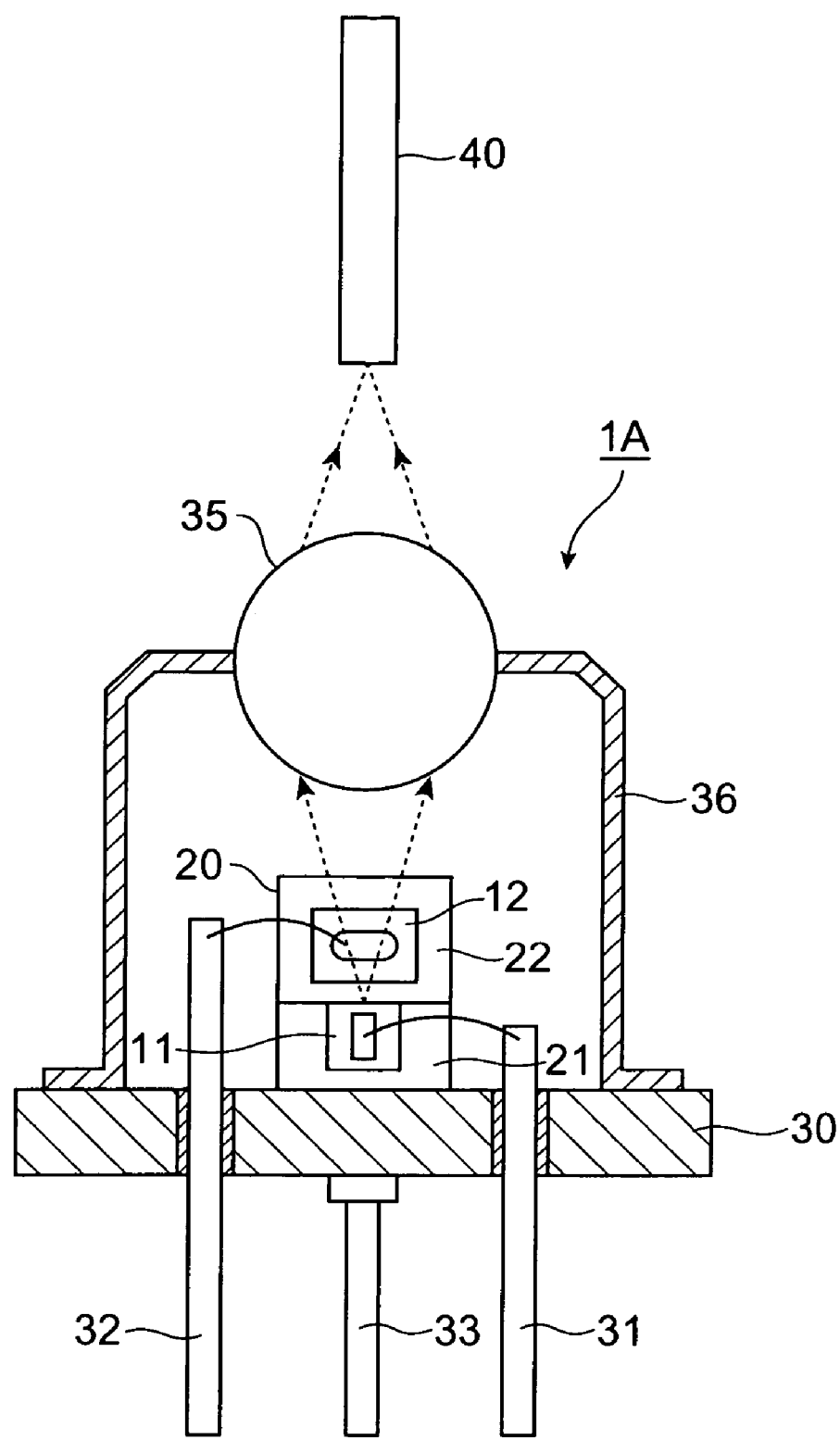
FIG. 1 is a front sectional view showing a configuration of the first embodiment of the optical transmission module.

The preferred embodiments of the optical transmission module and the optical transmitter using it according to the present invention will be described below in detail with reference to the drawings. The same elements will be denoted by the same reference symbols throughout the description of the drawings, without redundant description thereof. It is also noted that the dimensional ratios in the drawings do not always agree with those in the description.

Figure 2:
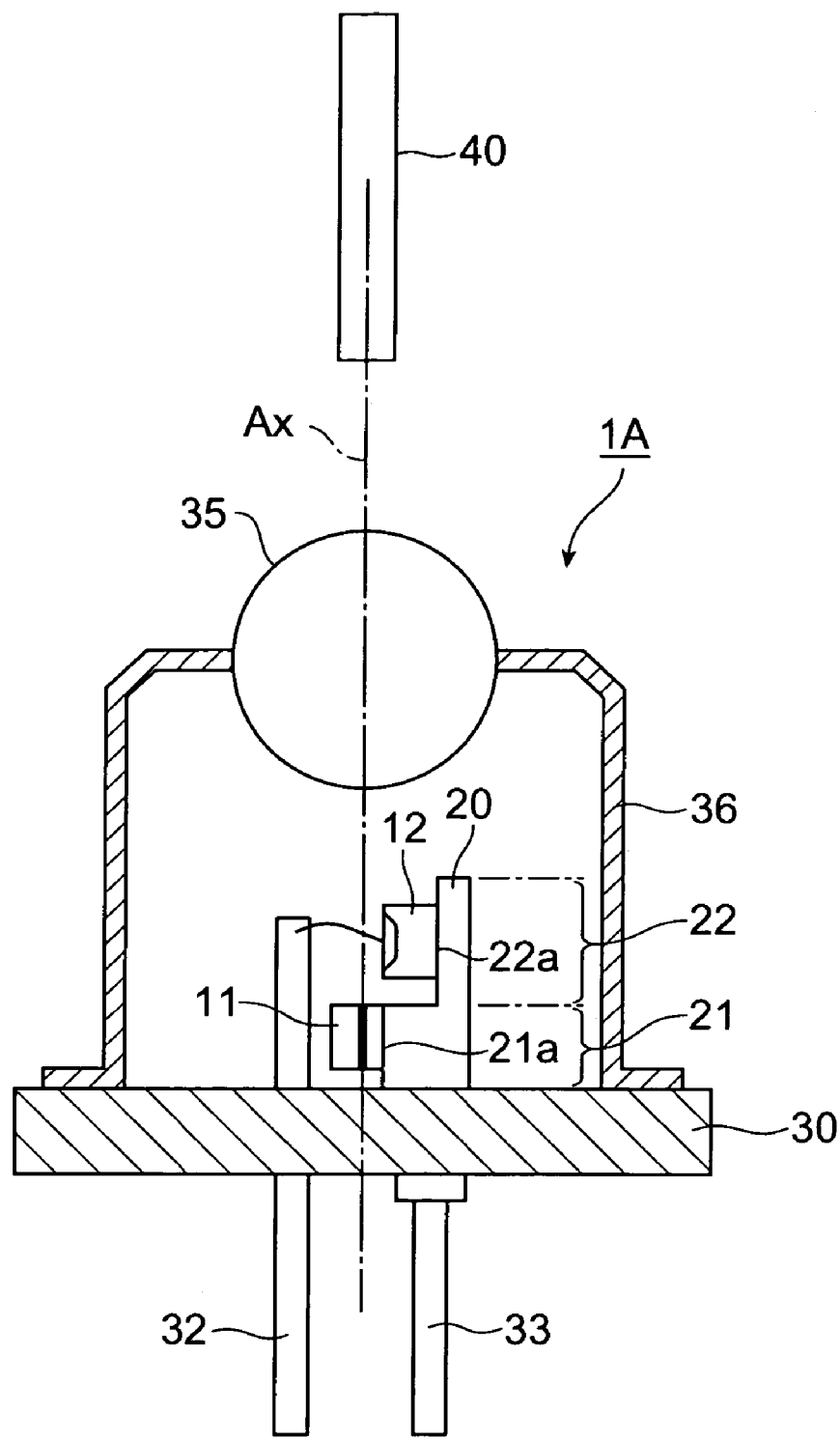
FIG. 2 is a side sectional view showing the configuration of the optical transmission module shown in FIG. 1.

FIG. 1 is a front sectional view showing the configuration of the first embodiment of the optical transmission module according to the present invention. FIG. 2 is a side sectional view showing the configuration of the optical transmission module shown in FIG. 1. FIGS. 1 and 2 both are the sectional views including the emission axis Ax (cf. FIG. 2) of the optical signal in the present optical transmission module.

The present optical transmission module 1A is used as an optical module for transmitting the optical signal, in the optical transmission systems or the like composed of optical fiber transmission lines and others, and is comprised of semiconductor laser (LD) 11, monitor photodiode (M-PD) 12, and stem 30 as a base supporting them. The stem 30 is comprised of a member of disk shape and is formed, for example, in the outside diameter $\phi$ of 3.8 mm and in the thickness of 1.0 mm.

The semiconductor laser 11 is a light emitting device configured to emit light to be outputted as an optical signal from the optical transmission module 1A. This semiconductor laser 11 converts an electric signal supplied as a drive current, into an optical signal. It emits the light along the emission axis Ax and forward in the opposite direction to the stem 30. The semiconductor laser 11 has, for example, the size of 0.25 mm horizontal, 0.3 mm vertical, and 0.2 mm thick.

For supporting the semiconductor laser 11 and others, pole 20 is provided nearly perpendicularly to the stem 30 on the stem 30. This pole 20 is comprised of emitter loading portion 21 as a part on the stem 30 side (backward side), and receiver loading portion 22 as part on the opposite side (forward side) to the stem 30. The pole 20 has, for example, the size of 1.2 mm horizontal.

The pole 20 is a mount member on which the semiconductor laser 11 and the monitor photodiode 12 are mounted, and is located at a position slightly off the emission axis Ax of light, as shown in FIG. 2. The semiconductor laser 11 is loaded on emitter loading surface 21a of the emitter loading portion 21 facing the emission axis Ax on the backward side so that the optical axis thereof agrees with the emission axis Ax.

The photodiode 12 is loaded on receiver loading surface 22a of the receiver loading portion 22 facing the emission axis Ax on the forward side with respect to the semiconductor laser 11 and the emitter loading portion 21. The photodiode 12 is a monitor light receiving device for detecting part of the light emitted from the semiconductor laser 11. The photodiode 12 has, for example, the size of 0.38 mm horizontal, 0.38 mm vertical, and 0.3 mm thick.

The receiver loading portion 22 of the pole 20 is formed in a stepped shape relative to the emitter loading portion 21 so that the receiver loading surface 22a is more distant from the emission axis Ax than the emitter loading surface 21a (cf. FIG. 2). In this configuration, the monitor photodiode 12 on the receiver loading surface 22a is located so as to be able to detect part of the light emitted forward from the semiconductor laser 11, at the position off the emission axis Ax of light from the semiconductor laser 11.

This enables the photodiode 12 to monitor the operating condition of the semiconductor laser 11. For example, the drive current supplied to the semiconductor laser 11 is subjected to feedback control with reference to the value of current monitored by the photodiode 12, which enables the APC driving to keep constant the intensity of the light emitted from the semiconductor laser 11.

Condenser lens 35 consisting of a spherical lens or an aspherical lens is placed on the forward side relative to the semiconductor laser 11. The condenser lens 35 is located between the semiconductor laser 11 and optical fiber 40, which is an optical waveguide for guiding the light emitted from the semiconductor laser 11, so that the optical axis thereof agrees with the emission axis Ax of the semiconductor laser 11. This makes the light from the semiconductor laser 11 enter the optical fiber 40 while being condensed by the condenser lens 35, whereby the light from the semiconductor laser 11 is efficiently outputted.

These condenser lens 35 and optical fiber 40 function as a light outputting means for outputting the light emitted from the semiconductor laser 11, as an optical signal. The condenser lens 35 is supported through lens cap 36 on the stem 30. The lens cap 36 is made, preferably, of a metal material and is provided in contact with the edge part of stem 30. The lens cap 36 is a nearly cylindrical member and is formed, for example, in the outside diameter $\phi$ of 2.5 mm and the height of 2.0 mm. An aperture is bored at the position facing the semiconductor laser 11, in the lens cap 36, and the condenser lens 35 is fixed to this aperture with an adhesive. The size of the condenser lens 35 is, for example, the outside diameter $\phi$ of 0.8 mm.

Lead pins 31–33 used in input/output of electric signals and others are fixed to the stem 30. Among these, the lead pins 31, 32 are fixed through and to the stem 30. The lead pin 31 is connected through a bonding wire to the semiconductor laser 11 and is used for supplying the drive current to the semiconductor laser 11. The lead pin 32 is connected through a bonding wire to the monitor photodiode 12 and is used for outputting the monitor current from the photodiode 12. The lead pin 33 is fixed to the lower surface of stem 30.

In the above configuration, when the drive current such as a rectangular wave or the like is supplied through the lead pin 31 to the semiconductor laser 11, the semiconductor laser 11 generates light of a predetermined wavelength and emits it forward along the emission axis Ax. The light from the semiconductor laser 11 is guided through the condenser lens 35 and optical fiber 40 to be outputted as an optical signal of a waveform corresponding to the waveform of the drive current. The monitor photodiode 12 detects part of the light emitted forward from the semiconductor laser 11. The monitor current flowing in the photodiode 12 in accordance with the intensity of the detected light is outputted through the lead pin 32.

The effect of the optical transmission module in the present embodiment will be described below. In the optical transmission module 1A shown in FIGS. 1 and 2, the monitor photodiode 12 for the semiconductor laser 11 is not located on the stem 30 side being the backward side of the semiconductor laser 11, but is located on the condenser lens 35 side being the forward side thereof. Then the photodiode 12 detects part of the light emitted forward from the semiconductor laser 11 to monitor the operating condition of the semiconductor laser 11.

This configuration obviates the need for locating the photodiode for detecting the backward light from the semiconductor laser between the semiconductor laser and the stem. In this case, it is feasible to achieve decrease in the length of the lead pin 31 penetrating the stem 30 and used for supply of the drive current to the semiconductor laser 11.

This restrains the deterioration of the waveform due to the impedance of the lead pin 31 and others, in the drive current supplied from the driving device through the lead pin 31 and wire to the semiconductor laser 11. Accordingly, the accurate drive current flows in the semiconductor laser 11, so that the optical transmission module 1A is obtained as one capable of outputting the optical signal of a good waveform. By achieving the optical signal of the good waveform in this way, it becomes feasible to stably transmit the optical signal over a long haul even at high transmission rates of not less than 1 Gbps, for example, at 5 Gbps or 10 Gbps.

Figure 11:
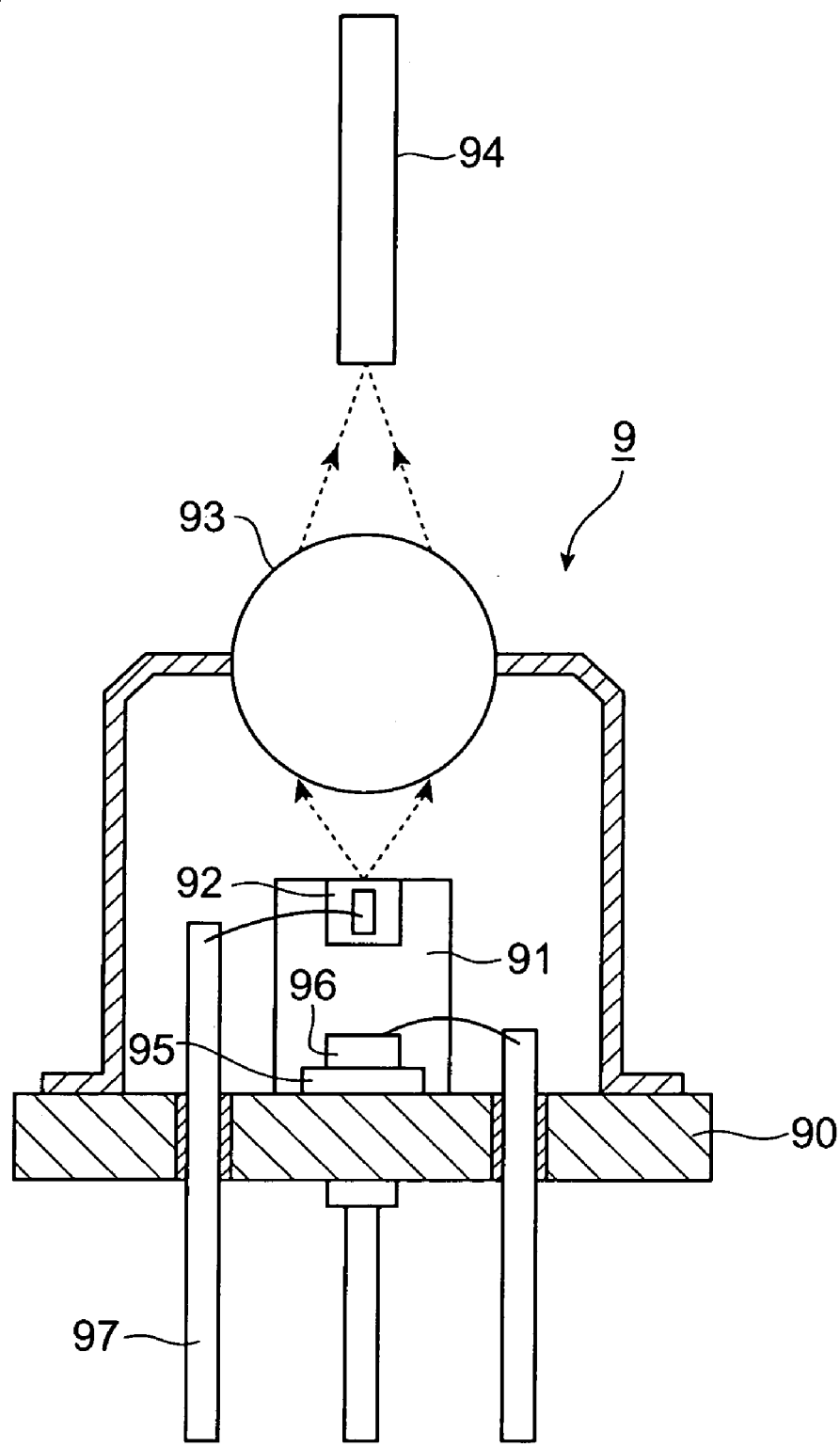
FIG. 11 is a front sectional view showing the configuration of the conventional optical transmission module.

The effect will be described with specific examples below. In the configuration example shown in FIG. 11 where the monitor photodiode 96 is located on the stem 90 side, the length of the projecting part of the lead pin 97 above the stem (the length inside the package) for supplying the drive current to the semiconductor laser 92 is, for example, approximately 1.0 mm; whereas, in the case of the embodiment shown in FIG. 1 where the monitor photodiode 12 is located on the condenser lens 35 side and where the semiconductor laser 11 is set at the position nearer to the stem 30, the length of the projecting part of the lead pin 31 can be reduced to the length of approximately one third, for example, 0.3 mm.

As for the detection of the light from the semiconductor laser 11 by the monitor photodiode 12, where the semiconductor laser 11 is an InGaAsP-based 1.3 µm LD, the forward light is emitted at the intensity of about 10 mW. When the monitor photodiode 12 is a photodiode with a light receiving layer of InGaAs, the photodiode of this type has the value of about 0.7 to 0.9 A/W and thus has extremely high sensitivity.

When the semiconductor laser 11 is driven by the APC driving on the basis of the monitor current value at the monitor photodiode 12, approximately 50–200 µA is sufficient for the monitor current necessary for the APC driving. In the configuration shown in FIG. 1, therefore, the appropriate monitor current can be obtained by detecting approximately several % of the light emitted forward from the semiconductor laser 11, by the monitor photodiode 12.

The documents 1–3 also describe the configurations of detecting part of the light emitted from the semiconductor laser. The configurations described in these documents, however, all are those of detecting part of the backward light from the semiconductor laser to monitor the operating condition. Since the monitor photodiode is located on the stem side in these configurations, it is infeasible to achieve decrease in the length of the lead pin to the semiconductor laser.

In contrast to it, the optical transmission module according to the present embodiment is constructed in the configuration wherein the monitor photodiode 12 is located on the light outputting means side relative to the semiconductor laser 11 and detects part of the forward light from the semiconductor laser 11 to monitor the operating condition. This configuration achieves the decrease in the length of the lead pin 31 to the semiconductor laser 11 and is able to restrain the deterioration of the waveform of the drive current as described above. Since the configuration shown in FIG. 1 requires no backward light from the semiconductor laser 11 a chip of semiconductor laser 11 may be provided with the rear end face of high reflectance (e.g., 90% or more).

In the optical transmission module 1A of the present embodiment, the semiconductor laser 11 and monitor photodiode 12 are mounted in the coaxial configuration in the metal package, without using a large butterfly package. The use of this configuration substantializes the optical transmission module that is highly versatile, compact, and inexpensive and that can be applied to the transmission of optical signals at high rates of 5 Gbps and 10 Gbps.

In the above embodiment, the configuration of mounting the semiconductor laser 11 and the monitor photodiode 12 on the pole 20 of the mount member is the configuration wherein the pole 20 having the emitter loading portion 21 and the receiver loading portion 22 is provided on the stem 30. In the pole 20, the receiver loading portion 22 is formed in the stepped form relative to the emitter loading portion 21, thereby setting the positional relation between the semiconductor laser 11 and the monitor photodiode 12.

This configuration suitably achieves both the configuration of outputting the light emitted forward from the semiconductor laser 11, through the light outputting means to the outside, and the configuration of detecting part of the light emitted forward from the semiconductor laser 11, by the monitor photodiode 12 to monitor the operating condition of the semiconductor laser 11.

Figure 3:
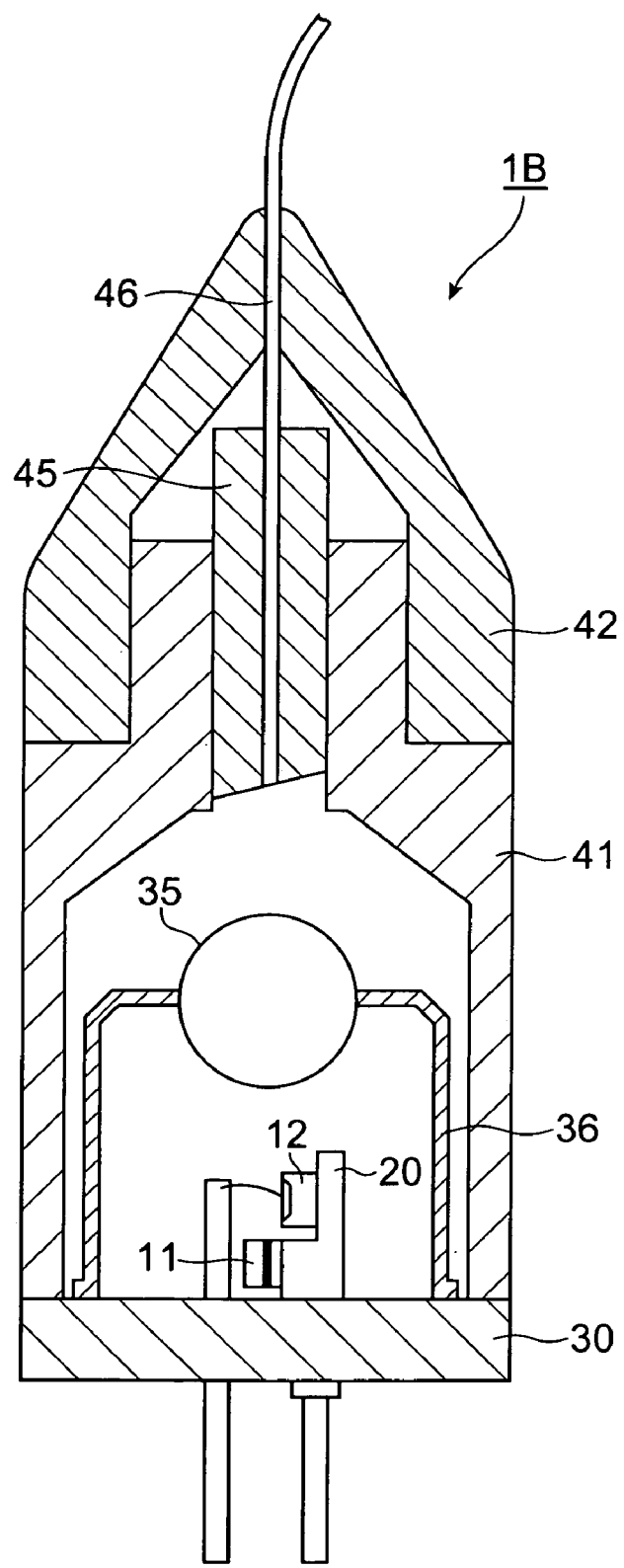
FIG. 3 is a side sectional view showing a configuration of the second embodiment of the optical transmission module.

FIG. 3 is a side sectional view showing the configuration of the second embodiment of the optical transmission module. The optical transmission module 1B of the present embodiment is of a pigtail configuration. The configuration of the optical transmission module 1B is much the same as the configuration of the optical transmission module 1A shown in FIGS. 1 and 2, as to the semiconductor laser 11, monitor photodiode 12, pole 20, stem 30, condenser lens 35, and lens cap 36.

The present optical transmission module 1B is formed in the coaxial configuration in a metal package. In the present embodiment, a housing of the optical transmission module 1B is composed of stem 30 as a base supporting the semiconductor laser 11 and others, and housing members 41, 42 provided on the stem 30 so as to cover the semiconductor laser 11 and others.

Ferrule 45 is fixed at a position facing the condenser lens 35, to the housing member 41 located on the stem 30 side among the housing members 41, 42. Optical fiber 46 penetrates the ferrule 45 so that the optical axis thereof coincides with that of the semiconductor laser 11 and condenser lens 35. This optical fiber 46 is a pigtail fiber extending through an aperture provided in the upper part of the housing member 42 to the outside and used for outputting the light emitted from the semiconductor laser 11, to the outside. In the present embodiment, the condenser lens 35 and pigtail fiber 46 constitute the light outputting means.

Figure 4:
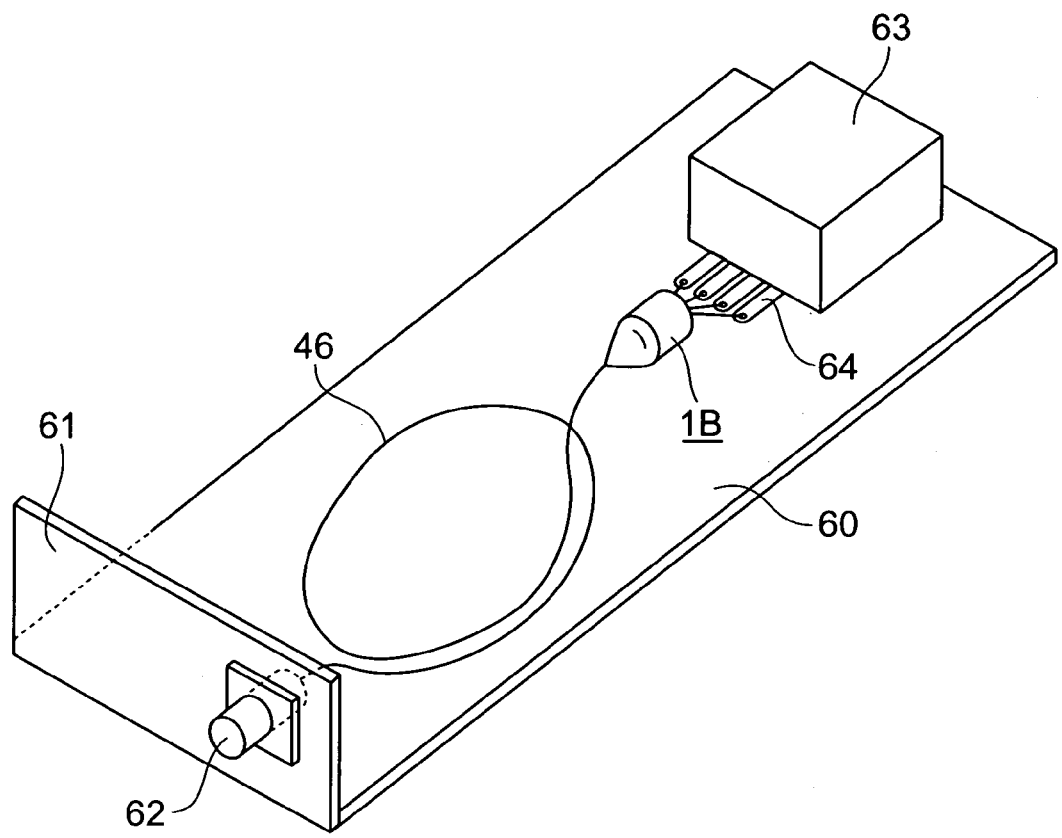
FIG. 4 is a perspective view showing a configuration of an optical transmitter using the optical transmission module shown in FIG. 3.

FIG. 4 is a perspective view showing a configuration of an embodiment of the optical transmitter according to the present invention. FIG. 4 shows a configuration example of the optical transmitter using the optical transmission module 1B of the pigtail type shown in FIG. 3.

In the present optical transmitter, the optical transmission module 1B is fixed on board 60 and the pigtail fiber 46 extends out of the package of the optical transmission module 1B. Panel 61 with optical connector 62 fixed thereto is provided at one edge of the board 60. The pigtail fiber 46 from the optical transmission module 1B is connected to this optical connector 62.

Driving circuit part 63 including the driving device for supplying the drive current to the semiconductor laser 11 of the optical transmission module 1B is placed on the board 60. The lead pins of the optical transmission module 1B are connected at their end to corresponding wires 64 from the driving circuit part 63 on the board 60.

When the optical transmitter is constructed using the optical transmission module 1B in this way, the optical transmitter can be obtained while restraining the deterioration of the waveform of the drive current supplied from the driving device to the semiconductor laser 11 and, in turn, restraining the deterioration of the waveform of the optical signal emitted from the semiconductor laser 11.

Figure 5:
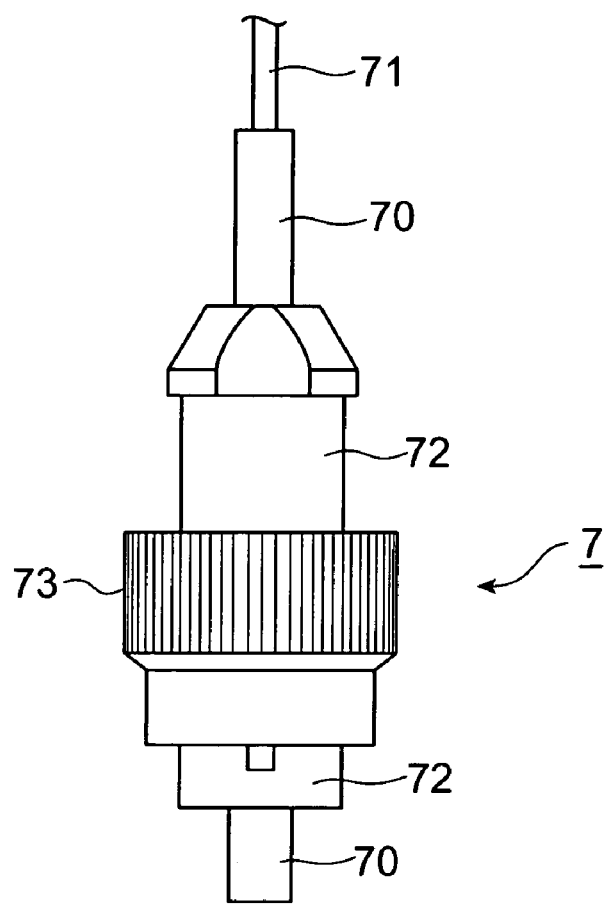
FIG. 5 is a side sectional view showing a configuration of the third embodiment of the optical transmission module.
Figure 5:
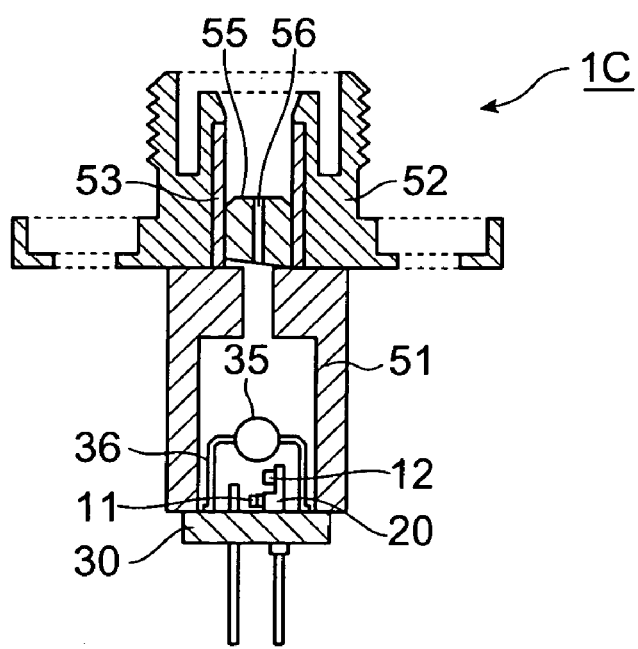

FIG. 5 is a side sectional view showing the configuration of the third embodiment of the optical transmission module. The optical transmission module 1C of the present embodiment is an optical transmission module of the receptacle configuration. The configuration of the optical transmission module 1C is much the same as the configuration of the optical transmission module 1A shown in FIGS. 1 and 2, as to the semiconductor laser 11, monitor photodiode 12, pole 20, stem 30, condenser lens 35, and lens cap 36.

The housing of the present optical transmission module 1C is composed of stem 30 as a base supporting the semiconductor laser 11 and others, and housing member 51 provided on the stem 30 so as to cover the semiconductor laser 11 and others.

In the upper part of the housing 51, connector 52 is set as a sleeve made of stainless steel and provided with a screw thread in its outside peripheral part. Sleeve 53 is disposed in a through hole of the connector 52. Inside this sleeve 53, ferrule 55 with optical fiber 56 therein is fixed so that the optical axis thereof agrees with that of the semiconductor laser 11 and condenser lens 35. In the present embodiment, the condenser lens 35 and optical fiber 56 constitute the light outputting means. The connector 52 and sleeve 53 constitute a receptacle portion for receiving an optical fiber, or a fiber-integrated ferrule with an optical fiber therein.

FIG. 5 also shows optical connector 7 to be connected to the optical transmission module 1C, in addition to the optical transmission module 1C. The optical connector 7 has fiber-integrated ferrule 70 with optical fiber 71 set therethrough, sleeve 72 with the ferrule 70 set inside, and ring 73 arranged rotatably outside the outside peripheral part of the sleeve 72.

In this configuration, when the ferrule 70 of the optical connector 7 is inserted in a space defined by the inside peripheral surface of sleeve 53 and the top surface of ferrule 55, in the receptacle part of the optical transmission module 1C, the optical fiber 56 in the light outputting means of the optical transmission module 1C is optically coupled to the optical fiber 71 for output of the optical signal in the optical connector 7. The inside peripheral part of the ring 73 is provided with a thread at the same pitch as that of the male thread of the connector 52. This permits the connector 52 and optical connector 7 to be fixed to each other.

Figure 6:
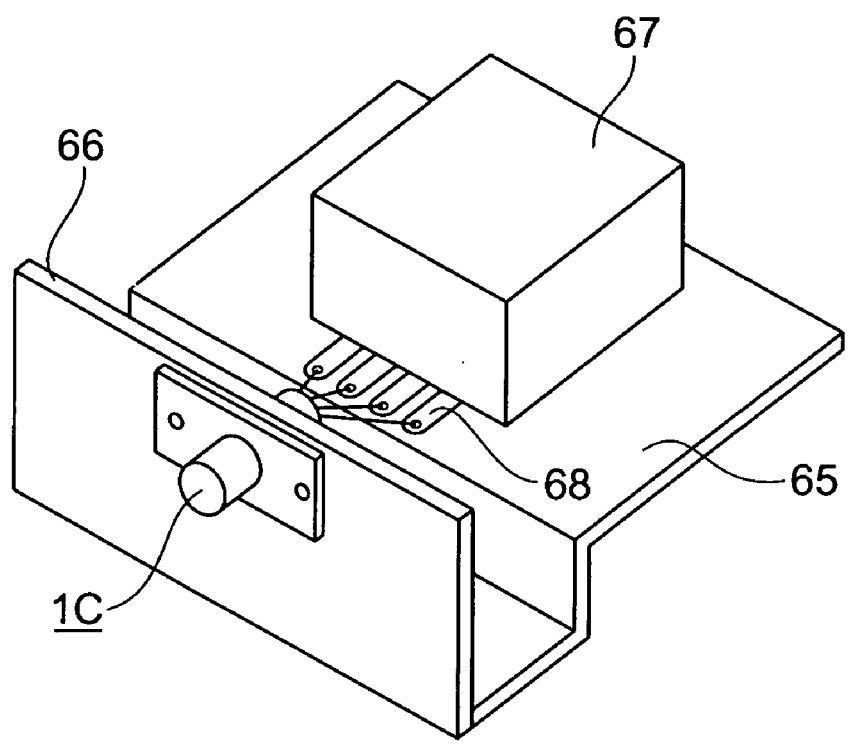
FIG. 6 is a perspective view showing a configuration of an optical transmitter using the optical transmission module shown in FIG. 5.

FIG. 6 is a perspective view showing a configuration of another embodiment of the optical transmitter according to the present invention. FIG. 6 shows a configuration example of the optical transmitter using the optical transmission module 1C of the receptacle type shown in FIG. 5.

In the present optical transmitter, the optical transmission module 1C is fixed to panel 66 provided at one edge of board 65. Driving circuit part 67 including the driving element for supplying the drive current to the semiconductor laser 11 of the optical transmission module 1C is placed on the board 65. The lead pins of the optical transmission module 1C are connected at their end to corresponding wires 68 from the driving circuit part 67 on the board 65.

When the optical transmitter is constructed using the optical transmission module 1C in this way, the optical transmitter is obtained while restraining the deterioration of the waveform of the drive current supplied from the driving device to the semiconductor laser 11 and, in turn, restraining the deterioration of the waveform of the optical signal emitted from the semiconductor laser 11, just as in the case of the optical transmitter shown in FIG. 4.

Figure 7:
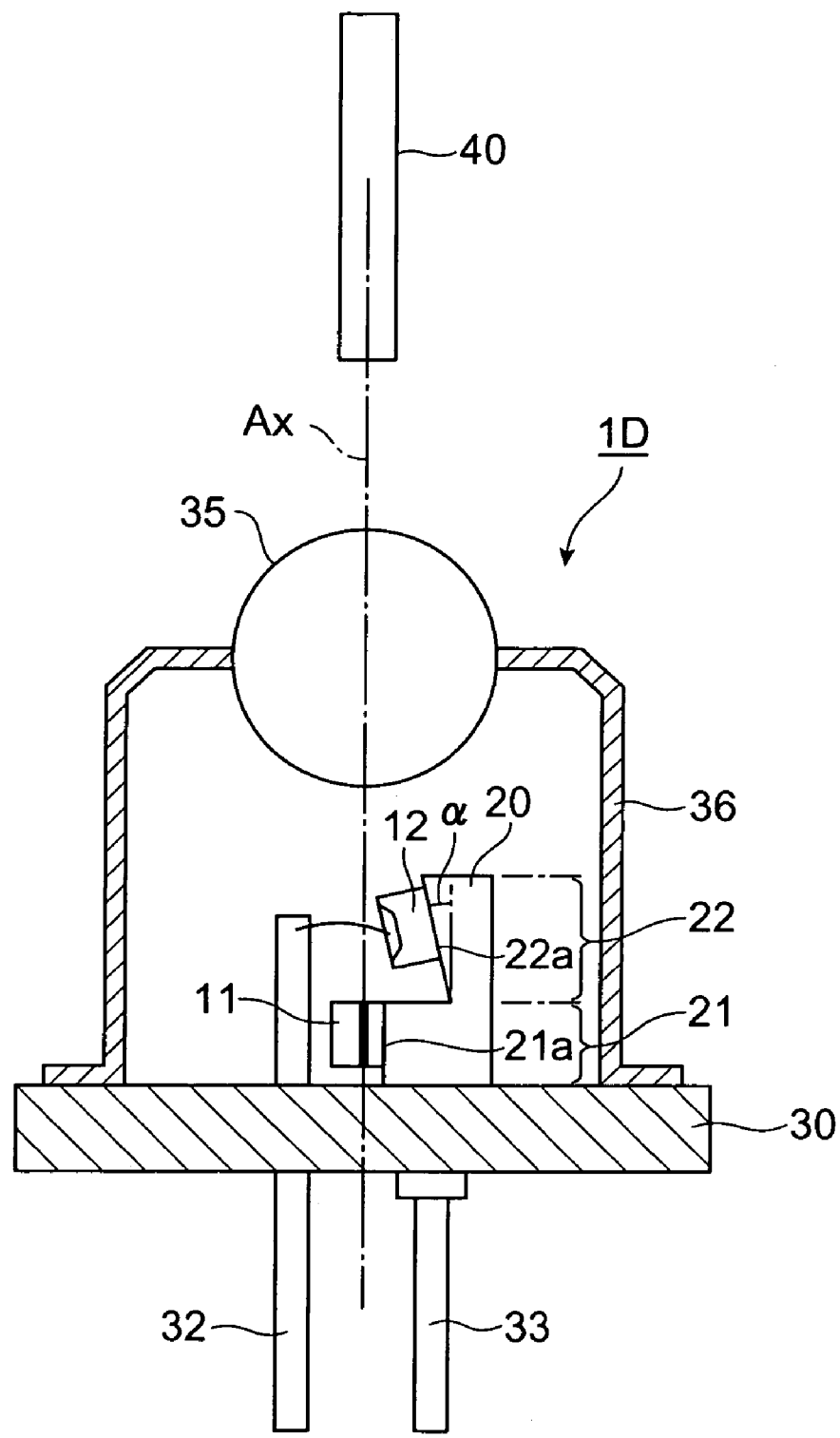
FIG. 7 is a side sectional view showing a configuration of the fourth embodiment of the optical transmission module.

FIG. 7 is a side sectional view showing the configuration of the fourth embodiment of the optical transmission module. FIG. 7 is a sectional view corresponding to FIG. 2 in the first embodiment and sectional view including the emission axis Ax of the optical signal in the present optical transmission module.

The present optical transmission module 1D is comprised of semiconductor laser 11, monitor photodiode 12, stem 30 as a base, pole 20 provided on the stem 30, and lead pins 31–33 fixed to the stem 30. As the light outputting means for the semiconductor laser 11, the condenser lens 35 supported by lens cap 36, and optical fiber 40 are disposed on the forward side relative to the semiconductor laser 11.

The pole 20 is composed of emitter loading portion 21 on the stem 30 side and receiver loading portion 22 on the condenser lens 35 side, and is located at a position slightly off the emission axis Ax of light. The semiconductor laser 11 is mounted on emitter loading surface 21a of the emitter loading portion 21 so that the optical axis thereof agrees with the emission axis Ax.

The monitor photodiode 12 for detecting part of the light emitted from the semiconductor laser 11 is mounted on receiver loading surface 22a of the receiver loading portion 22 on the forward side. The receiver loading portion 22 of the pole 20 is formed in a stepped shape relative to the emitter loading portion 21 so that the receiver loading surface 22a thereof is more distant from the emission axis Ax than the emitter loading surface 21a. This results in locating the monitor photodiode 12 at the predetermined position off the emission axis Ax.

In the pole 20 of the present embodiment, the receiver loading portion 22 is formed so that the receiver loading surface 22a loaded with the monitor photodiode 12 is inclined at a predetermined angle α of inclination relative to the emission axis Ax of the light from the semiconductor laser 11.

The effect of the optical transmission module in the present embodiment will be described. In the optical transmission module 1D shown in FIG. 7, the photodiode 12 located on the forward side relative to the semiconductor laser 11 monitors the operating condition of the semiconductor laser 11. This achieves the decrease in the length of the lead pin 31 used for supply of the drive current to the semiconductor laser 11, and thus restrains the deterioration of the waveform of the drive current.

The pole 20 is formed so that the receiver loading surface 22a of the receiver loading portion 22 is the surface inclined relative to the emission axis Ax. This configuration increases the solid angle of the photodiode 12 from the semiconductor laser 11 and enables the photodiode 12 to efficiently detect part of the light emitted forward from the semiconductor laser 11. The angle α of inclination of the receiver loading surface 22a is preferably set, for example, within the range of 8°–16°.

Figure 8:
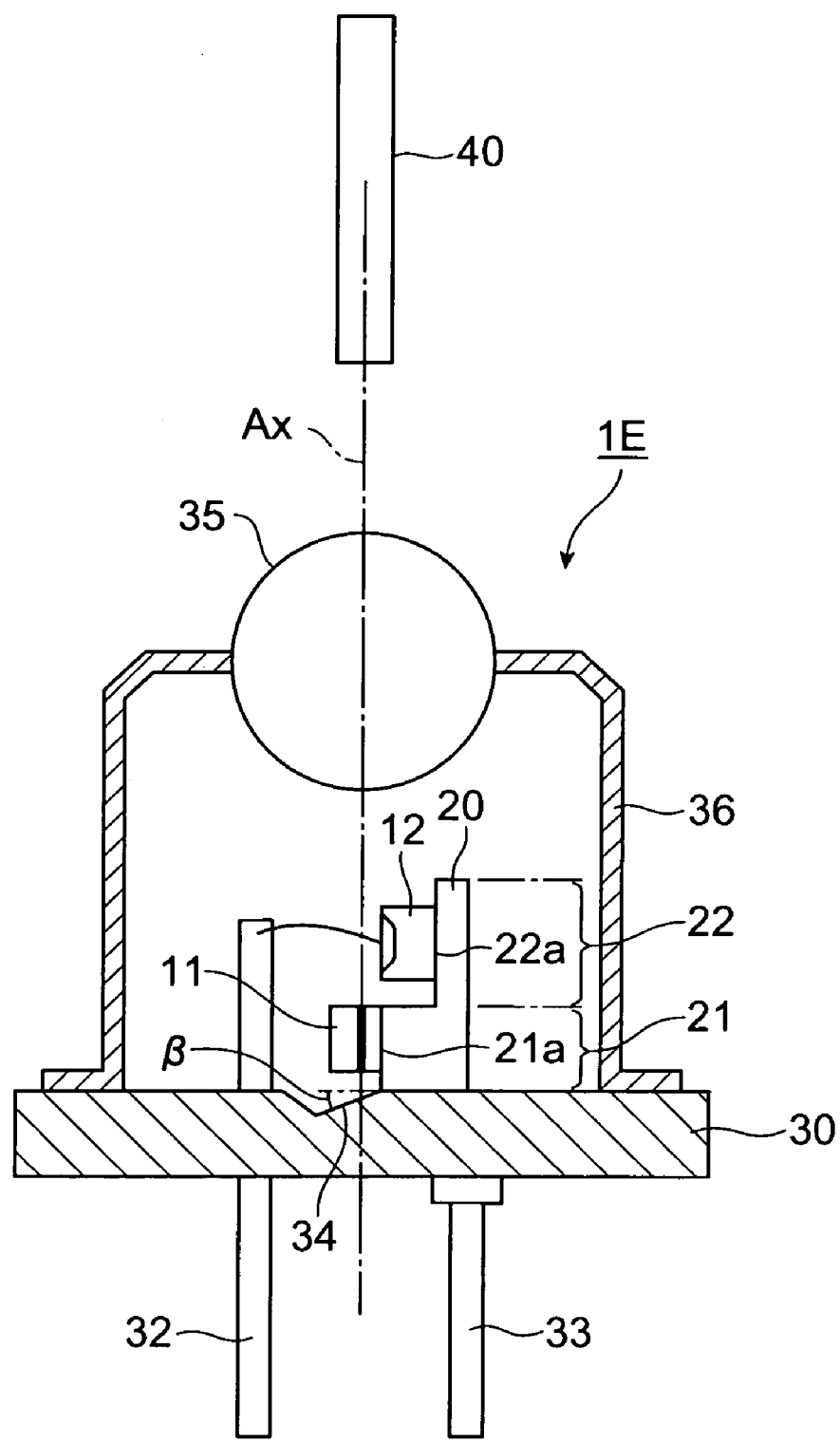
FIG. 8 is a side sectional view showing a configuration of the fifth embodiment of the optical transmission module.

FIG. 8 is a side sectional view showing the configuration of the fifth embodiment of the optical transmission module. FIG. 8 is a sectional view corresponding to FIG. 2 in the first embodiment and sectional view including the emission axis Ax of the optical signal in the present optical transmission module.

The present optical transmission module 1E is comprised of semiconductor laser 11, monitor photodiode 12, stem 30 as a base, pole 20 provided on the stem 30, and lead pins 31–33 fixed to the stem 30. As the light outputting means for the semiconductor laser 11, condenser lens 35 supported by lens cap 36, and optical fiber 40 are located on the forward side relative to the semiconductor laser 11.

The pole 20 is composed of emitter loading portion 21 on the stem 30 side and receiver loading portion 22 on the condenser lens 35 side and is located at a position slightly off the emission axis Ax of light. The semiconductor laser 11 is mounted on emitter loading surface 21a of the emitter loading portion 21 so that the optical axis thereof agrees with the emission axis Ax.

The monitor photodiode 12 is mounted on receiver loading surface 22a of the receiver loading portion 22 on the forward side. The receiver loading portion 22 of the pole 20 is formed in a stepped shape relative to the emitter loading portion 21 so that the receiver loading surface 22a thereof is located at the position more distant from the emission axis Ax than the emitter loading surface 21a. This results in locating the monitor photodiode 12 at the predetermined position off the emission axis Ax.

In the stem 30 of the present embodiment, slant surface 34 inclined at a predetermined angle β of inclination relative to a plane normal to the emission axis Ax of light from the semiconductor laser 11 is formed in a predetermined portion of an upper surface of the stem 30 located behind the semiconductor laser 11.

The effect of the optical transmission module in the present embodiment will be described. In the optical transmission module 1E shown in FIG. 8, the photodiode 12 located on the forward side relative to the semiconductor laser 11 monitors the operating condition of the semiconductor laser 11. This achieves the decrease in the length of the lead pin 31 used for supply of the drive current to the semiconductor laser 11, and thus restrains the deterioration of the waveform of the drive current.

The stem 30 is formed so that the part facing the semiconductor laser 11 is the slant surface 34 inclined relative to the plane normal to the emission axis Ax. This configuration prevents the light emitted backward from the semiconductor laser 11 from returning as return light reflected by the stem 30, to the semiconductor laser 11. The angle β of inclination of the slant surface 34 is preferably set, for example, within the range of 8°–12°.

Figure 9:
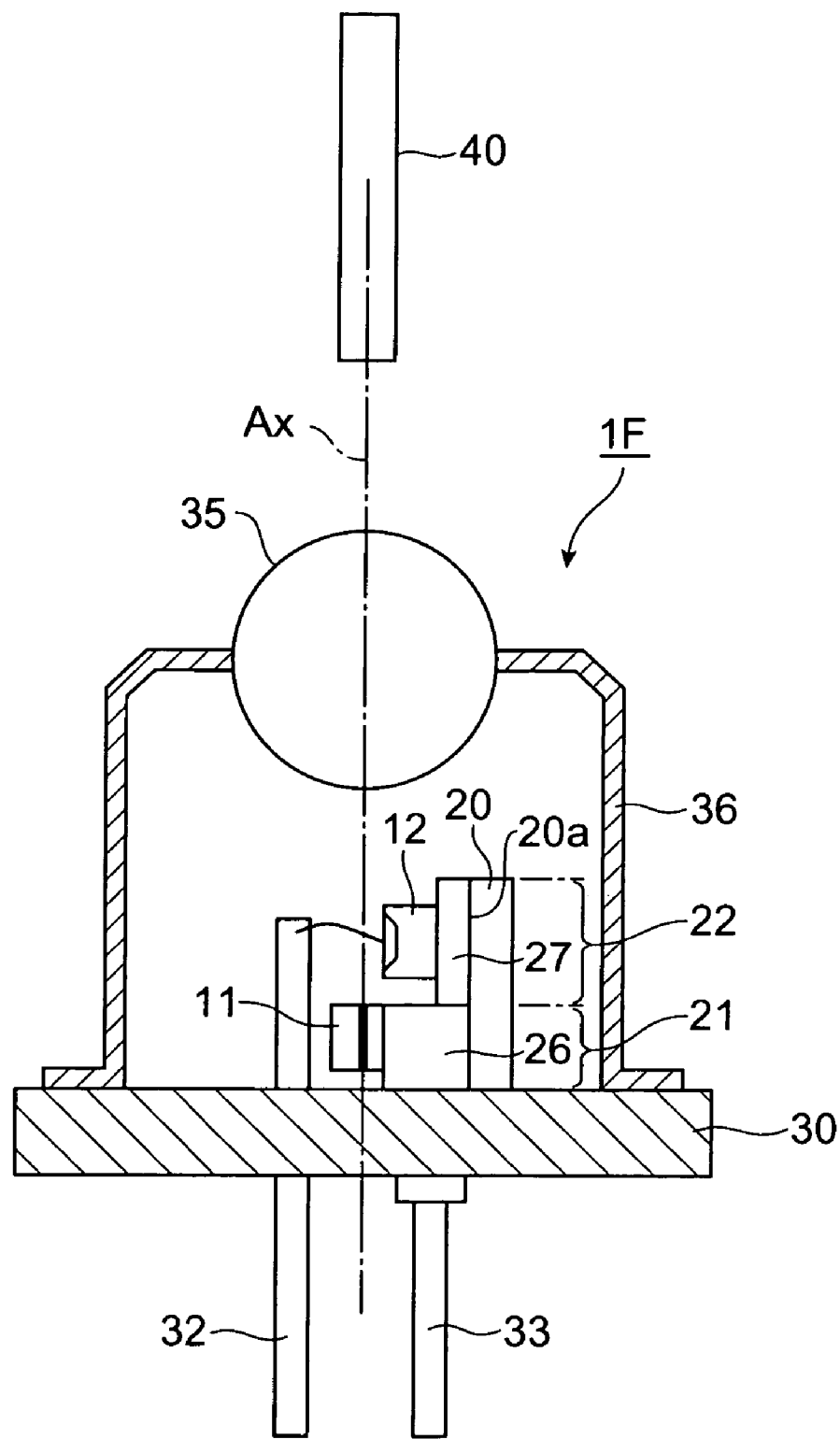
FIG. 9 is a side sectional view showing a configuration of the sixth embodiment of the optical transmission module.

FIG. 9 is a side sectional view showing the configuration of the sixth embodiment of the optical transmission module. FIG. 9 is a sectional view corresponding to FIG. 2 in the first embodiment and sectional view including the emission axis Ax of the optical signal in the present optical transmission module.

The present optical transmission module 1F is comprised of semiconductor laser 11, monitor photodiode 12, stem 30 as a base, pole 20 provided on the stem 30, and lead pins 31–33 fixed to the stem 30. As the light outputting means for the semiconductor laser 11, condenser lens 35 supported by lens cap 36, and optical fiber 40 are located on the forward side relative to the semiconductor laser 11.

The pole 20 is composed of emitter loading portion 21 on the stem 30 side and receiver loading portion 22 on the condenser lens 35 side and is located at the position slightly off the emission axis Ax of light. In the present embodiment, the emitter loading surface of the emitter loading portion 21 facing the emission axis Ax and the receiver loading surface of the receiver loading portion 22 facing the emission axis Ax constitute a loading surface 20a without a step as a whole thereof.

Emitter loading submount 26 as an emitter loading member is provided on the surface corresponding to the emitter loading portion 21 in the loading surface 20a of the pole 20. The semiconductor laser 11 is mounted on this emitter loading submount 26 so that the optical axis thereof agrees with the emission axis Ax.

Receiver loading submount 27 as a receiver loading member is provided on the surface corresponding to the receiver loading portion 22 in the loading surface 20a, and the monitor photodiode 12 is mounted on this receiver loading submount 27. The receiver loading submount 27 is configured in a step form relative to the emitter loading submount 26 so that the loading surface thereof is more distant from the emission axis Ax than the loading surface of the emitter loading submount 26. This results in locating the monitor photodiode 12 at the predetermined position off the emission axis Ax.

The effect of the optical transmission module in the present embodiment will be described. In the optical transmission module 1F shown in FIG. 9, the photodiode 12 located on the forward side relative to the semiconductor laser 11 monitors the operating condition of the semiconductor laser 11. This achieves the decrease in the length of the lead pin 31 used for supply of the drive current to the semiconductor laser 11 and thus restrains the deterioration of the waveform of the drive current.

In the present embodiment, the submounts 26, 27 are located on the loading surface 20a of the pole 20 and these submounts are configured in the step form, thereby setting the positional relation between the semiconductor laser 11 and the monitor photodiode 12.

This configuration suitably achieves both the configuration of outputting the light emitted forward from the semiconductor laser 11, through the light outputting means to the outside and the configuration of detecting part of the light emitted forward from the semiconductor laser 11, by the monitor photodiode 12 to monitor the operating condition of the semiconductor laser 11, similarly as the configuration of forming the loading portions 21, 22 of the pole 20 in the stepped form did.

These submounts 26, 27 are used for electrically isolating the semiconductor laser 11 and the monitor photodiode 12 from the stem 30 of the package and the pole 20. The submounts 26, 27 increase degrees of freedom of wires and can also be used for adjustment of the height of the semiconductor laser 11 and monitor photodiode 12. Concerning these submounts, another potential configuration is such that only one of the submounts 26, 27 for the semiconductor laser 11 and the monitor photodiode 12 is used for mounting of the corresponding component and that the other component is mounted on the loading surface of the pole 20.

Figure 10:
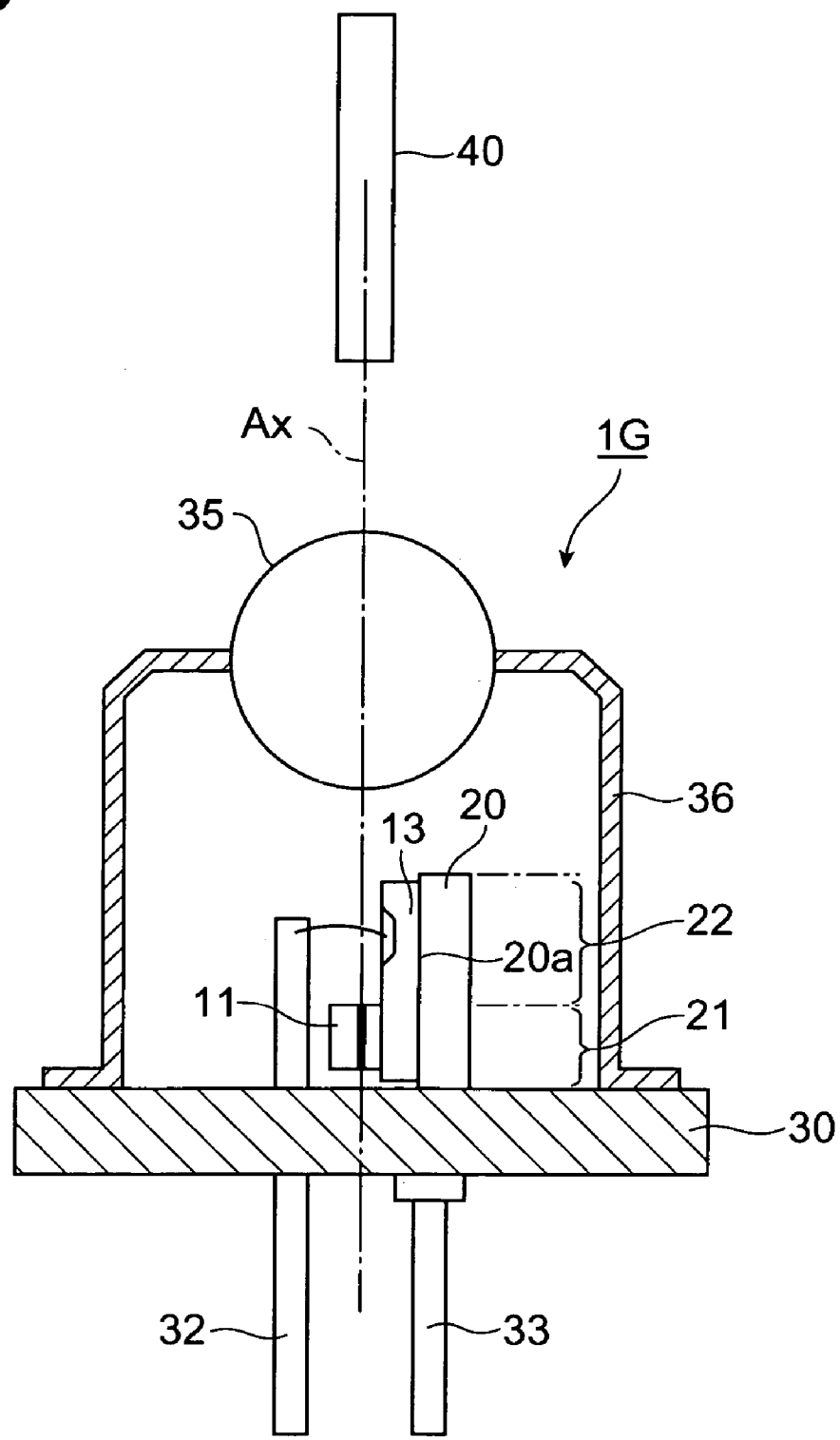
FIG. 10 is a side sectional view showing a configuration of the seventh embodiment of the optical transmission module.

FIG. 10 is a side sectional view showing the configuration of the seventh embodiment of the optical transmission module. FIG. 10 is a sectional view corresponding to FIG. 2 in the first embodiment and sectional view including the emission axis Ax of the optical signal in the present optical transmission module.

The present optical transmission module 1G is comprised of semiconductor laser 11, stem 30 as a base, pole 20 provided on the stem 30, and lead pins 31–33 fixed to the stem 30. As the light outputting means for the semiconductor laser 11, the condenser lens 35 supported by the lens cap 36, and the optical fiber 40 are placed on the forward side relative to the semiconductor laser 11. The present embodiment uses submount 13 integrated with a monitor photodiode, which will be described later, instead of the monitor photodiode 12.

The pole 20 is composed of emitter loading portion 21 on the stem 30 side and receiver loading portion 22 on the condenser lens 35 side, and is located at the position slightly off the emission axis Ax of light. In the present embodiment, the emitter loading surface of the emitter loading portion 21 facing the emission axis Ax and the receiver loading surface of the receiver loading portion 22 facing the emission axis Ax constitute loading surface 20a without a step as a whole thereof.

The monitor-photodiode-integrated submount 13 is mounted on the loading surface 20a of the pole 20. In the monitor-photodiode-integrated submount 13, the part on the surface corresponding to the emitter loading portion 21 serves as an emitter loading submount. The semiconductor laser 11 is mounted on the emitter loading submount part of the submount 13 so that the optical axis thereof agrees with the emission axis Ax.

In the monitor-photodiode-integrated submount 13, the part on the surface corresponding to the receiver loading portion 22 is constructed as a monitor photodiode. This results in locating the monitor photodiode part of the submount 13 at the predetermined position off the emission axis Ax.

The effect of the optical transmission module in the present embodiment will be described. In the optical transmission module 1G shown in FIG. 10, the photodiode part of the submount 13 located on the forward side relative to the semiconductor laser 11 monitors the operating condition of the semiconductor laser 11. This achieves the decrease in the length of the lead pin 31 used for supply of the drive current to the semiconductor laser 11, and restrains the deterioration of the waveform of the drive current.

The present embodiment uses the monitor-photodiode-integrated submount 13 also functioning as an emitter loading submount, instead of the monitor photodiode 12. This configuration is useful in integration, compactification, and reduction of cost of the optical transmission module.

The optical transmission modules and optical transmitters using them according to the present invention do not have to be limited to the above embodiments, but can be modified in various manners. For example, concerning the light outputting means for outputting the light emitted from the semiconductor laser 11, as an optical signal, the package holding the semiconductor laser 11, etc., the configurations in the above embodiments are just examples thereof, but they may be constructed in other configurations.

As detailed above, the optical transmission modules and the optical transmitters using them according to the present invention achieve the following effect. Namely, they are constructed in the structure wherein the monitor light receiving device is located on the forward side relative to the light emitting device such as a semiconductor laser or the like and wherein the light receiving device detects part of the light emitted forward from the light emitting device, whereby the optical transmission modules and the optical transmitters are substantialized while achieving the decrease in the length of the lead pin for supply of the drive current to the light emitting device and restraining the deterioration of the waveform of the drive current. In this case, the accurate drive current flows in the light emitting device and the output optical signal has the good waveform, so as to gain the optical signal capable of being stably transmitted even at high transmission rates.

It is apparent from the above description of the present invention that the present invention can be modified in various ways. It is noted that such modifications all are embraced within the present invention without departing from the spirit and scope of the present invention and all improvements obvious to those skilled in the art are included in the scope of claims which follow.

What is claimed is:

1. An optical transmission module comprising:
   a stem as a base;
   a mount member provided substantially perpendicularly to the stem;
   a light emitting device mounted at a predetermined position on the mount member and configured to emit light along an axis of emission and forward in an opposite direction to the stem;
   light outputting means disposed on the forward side of the light emitting device and configured to output the light emitted from the light emitting device, as an optical signal; and
   a monitor light receiving device mounted on the mount member at a position off the optical axis of the optical transmission module and closer to the light outputting means than the light emitting device, the monitor light receiving device configured to detect part of the light emitted from the light emitting device;
   wherein the light outputting means has an optical waveguide for guiding the light emitted from the light emitting device, and a lens disposed between the light emitting device and the optical waveguide and making the light from the light emitting device enter the optical waveguide.

2. The optical transmission module according to claim 1, wherein the mount member has an emitter loading portion loaded with the light emitting device, and a receiver loading portion loaded with the monitor light receiving device and formed in a stepped shape relative to the emitter loading portion.

3. The optical transmission module according to claim 1, wherein at least one of an emitter loading member loaded with the light emitting device and a receiver loading member loaded with the monitor light receiving device is placed on the mount member.

4. The optical transmission module according to claim 1, wherein the light outputting means has a pigtail fiber for outputting the light emitted from the light emitting device, to the outside.

5. The optical transmission module according to claim 1, comprising a receptacle member arranged to receive an optical fiber or a fiber-integrated ferrule with an optical fiber therethrough for outputting the light emitted from the light emitting device, to the outside, wherein the light outputting means comprises an optical waveguide for guiding the light emitted from the light emitting device, into the optical fiber received by the receptacle member.

6. An optical transmitter as in claim 1, further comprising a driving device for supplying a drive current to the light emitting device of the optical transmission module.

7. An optical transmission module comprising:
   a stem as a base;
   a mount member provided substantially perpendicularly to the stem;
   a light emitting device mounted at a predetermined position on the mount member and configured to emit light along an axis of emission and forward in an opposite direction to the stem;
   light outputting means disposed on the forward side of the light emitting device and configured to output the light emitted from the light emitting device as an optical signal; and
   a monitor light receiving device mounted on the mount member at a position off the optical axis of the optical transmission module and closer to the light outputting means than the light emitting device, the monitor light receiving device configured to detect part of the light emitted from the light emitting device;
   wherein the mount member has an emitter loading portion loaded with the light emitting device, and a receiver loading portion loaded with the monitor light receiving device and formed in a stepped shape relative to the emitter loading portion.

8. The optical transmission module according to claim 7, wherein the light outputting means has a pigtail fiber for outputting the light emitted from the light emitting device, to the outside.

9. The optical transmission module according to claim 7, comprising a receptacle member arranged to receive an optical fiber or a fiber-integrated ferrule with an optical fiber therethrough for outputting the light emitted from the light emitting device, to the outside, wherein the light outputting means comprises an optical waveguide for guiding the light emitted from the light emitting device, into the optical fiber received by the receptacle member.

10. An optical transmitter as in claim 7, further comprising a driving device for supplying a drive current to the light emitting device of the optical transmission module.

* * * * *